(12) United States Patent
Martch et al.

(10) Patent No.: US 8,873,927 B2
(45) Date of Patent: Oct. 28, 2014

(54) SYSTEMS AND METHODS FOR SELECTIVE ARCHIVAL OF MEDIA CONTENT

(75) Inventors: Henry Gregg Martch, Parker, CO (US);
William Michael Beals, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 13/610,725

(22) Filed: Sep. 11, 2012

(65) Prior Publication Data

US 2013/0007810 A1    Jan. 3, 2013

Related U.S. Application Data

(63) Continuation of application No. 12/632,942, filed on Dec. 8, 2009, now Pat. No. 8,315,502.

(51) Int. Cl.

| | |
|---|---|
| H04N 5/932 | (2006.01) |
| G11B 27/034 | (2006.01) |
| G06F 11/14 | (2006.01) |
| H04N 21/418 | (2011.01) |
| H04N 5/765 | (2006.01) |
| H04N 21/4147 | (2011.01) |
| H04N 21/426 | (2011.01) |
| H04N 5/781 | (2006.01) |

(52) U.S. Cl.
CPC .............. *H04N 5/765* (2013.01); *G11B 27/034* (2013.01); *G06F 11/1451* (2013.01); *H04N 21/4184* (2013.01); *G06F 11/1456* (2013.01); *H04N 21/4147* (2013.01); *H04N 21/42661* (2013.01); *H04N 5/781* (2013.01)
USPC .......................................... 386/216; 386/228

(58) Field of Classification Search
None
See application file for complete search history.

(56) References Cited

U.S. PATENT DOCUMENTS

| | | |
|---|---|---|
| 5,765,164 A | 6/1998 | Prasad et al. |
| 5,826,168 A | 10/1998 | Inoue et al. |
| 6,701,528 B1 | 3/2004 | Arsenault et al. |
| 7,110,006 B2 | 9/2006 | MacInnis et al. |
| 7,191,215 B2 | 3/2007 | Ganesan et al. |
| 7,568,129 B2 | 7/2009 | Sugihara |

(Continued)

FOREIGN PATENT DOCUMENTS

| | | |
|---|---|---|
| JP | 2001169235 A | 6/2001 |
| JP | 200227337 A | 1/2002 |

(Continued)

OTHER PUBLICATIONS

International Search Report and Written Opinion mailed on Mar. 31, 2011 for PCT/US2010/059013.

(Continued)

*Primary Examiner* — William C Vaughn, Jr.
*Assistant Examiner* — Eileen Adams
(74) *Attorney, Agent, or Firm* — Ingrassia Fisher & Lorenz, P.C.

(57) ABSTRACT

Described herein are techniques for selective archival of media content. A first entertainment device stores a plurality of media content files on a first storage medium. The first entertainment devices selects a portion of the media content files for backup based on characteristics of the media content files and transmits the portion of the media content files to a second entertainment device through a communication network. The second entertainment device stores the portion of the media content files on a second storage medium associated therewith.

21 Claims, 6 Drawing Sheets

(56) References Cited

U.S. PATENT DOCUMENTS

| | | |
|---|---|---|
| 7,581,238 B1 | 8/2009 | Taylor et al. |
| 7,627,888 B2 | 12/2009 | Ganesan et al. |
| 8,024,757 B2 | 9/2011 | Nara et al. |
| 8,315,502 B2 | 11/2012 | Martch et al. |
| 2001/0019630 A1 | 9/2001 | Johnson et al. |
| 2002/0154892 A1 | 10/2002 | Hoshen et al. |
| 2003/0026254 A1 | 2/2003 | Sim et al. |
| 2004/0143672 A1 | 7/2004 | Padmanabham et al. |
| 2005/0120373 A1 | 6/2005 | Thomas et al. |
| 2006/0037037 A1 | 2/2006 | Miranz et al. |
| 2006/0085817 A1 | 4/2006 | Kim et al. |
| 2006/0206609 A1 | 9/2006 | Ganesan et al. |
| 2006/0206889 A1 | 9/2006 | Ganesan et al. |
| 2006/0218217 A1 | 9/2006 | Ganesan et al. |
| 2006/0218218 A1 | 9/2006 | Ganesan et al. |
| 2006/0218220 A1 | 9/2006 | Ganesan et al. |
| 2006/0248078 A1 | 11/2006 | Gross et al. |
| 2007/0038687 A1* | 2/2007 | Carroll et al. ............ 707/204 |
| 2007/0056002 A1 | 3/2007 | Ganesan et al. |
| 2007/0133953 A1 | 6/2007 | Fontijn et al. |
| 2007/0255913 A1 | 11/2007 | Weaver et al. |
| 2008/0022343 A1 | 1/2008 | Hodzic et al. |
| 2008/0216120 A1* | 9/2008 | Knudson et al. ............ 725/40 |
| 2008/0243769 A1* | 10/2008 | Arbour et al. ............ 707/2 |
| 2008/0281913 A1 | 11/2008 | Shankar et al. |
| 2008/0282036 A1 | 11/2008 | Ganesan et al. |
| 2009/0024762 A1 | 1/2009 | Ganesan et al. |
| 2009/0024846 A1 | 1/2009 | Ganesan et al. |
| 2009/0025046 A1 | 1/2009 | Ganesan et al. |
| 2009/0031424 A1 | 1/2009 | Ganesan et al. |
| 2009/0106407 A1* | 4/2009 | Kodama et al. ............ 709/223 |
| 2009/0177712 A1 | 7/2009 | Shimizu et al. |
| 2010/0239226 A1* | 9/2010 | Mountain ............ 386/83 |
| 2010/0262997 A1* | 10/2010 | Dove ............ 725/44 |

FOREIGN PATENT DOCUMENTS

| | | |
|---|---|---|
| JP | 2007282043 A | 10/2007 |
| JP | 200852351 A | 3/2008 |
| KR | 1020020062456 A | 7/2002 |

OTHER PUBLICATIONS

Japan Patent Office, Notice of Rejection Grounds mailed Nov. 5, 2013 for Japanese Patent Application No. 2012-543174.

Australian Government, Patent Examination Report No. 1, dated Jul. 29, 2013 for Australian Patent Application No. 2010328446.

Intellectual Property Office, Office Action, dated Jul. 26, 2013 for Taiwan Patent Application No. 099142870.

* cited by examiner

SYSTEMS AND METHODS FOR SELECTIVE ARCHIVAL OF MEDIA CONTENT

CROSS-REFERENCES TO RELATED APPLICATIONS

This Application claims priority to U.S. Non-Provisional application Ser. No. 12/632,942, filed Dec. 8, 2009.

BACKGROUND

Digital video recorders allow users to store television programs, movies and other content for archival and subsequent viewing. The capacity of recording mediums of some digital video recorders (DVRs) allows for the storage of hundreds of hours of content which changes on a daily basis as users delete content and request recording of new content by the DVR. One problem with DVRs is that the associated recording mediums occasionally fail, causing a user to lose access to their recorded content. This is frustrating for the user, because it may take time to re-record the content during subsequent rebroadcasts of the content. It is even more frustrating for the user to lose some content which will be infrequently or never rebroadcast again.

BRIEF DESCRIPTION OF THE DRAWINGS

The same number represents the same element or same type of element in all drawings.

DETAILED DESCRIPTION OF THE DRAWINGS

Figure 1:
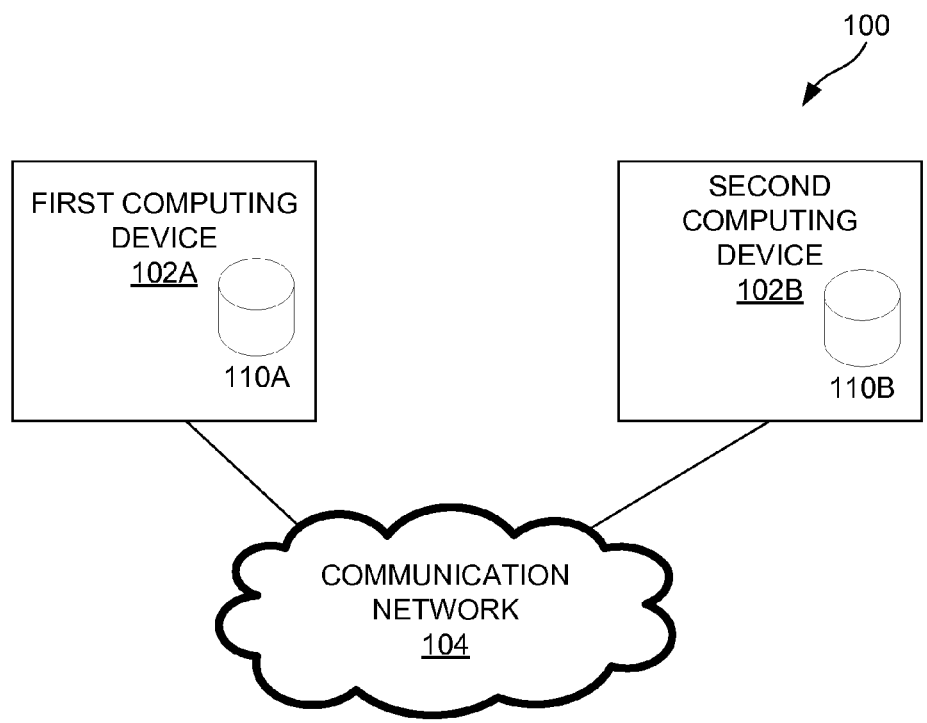
FIG. 1 illustrates an embodiment of a communication system.

Described herein are systems, methods and apparatus for archiving data for backup and restoration. More particularly, described herein are systems, methods and apparatus for selecting portions of data stored on a first storage medium for selective backup on a second storage medium. Rather than backing up an entire storage medium for possible restoration later, portions of the data stored on the storage medium are selected for backup on another storage medium based on characteristics or attributes of the data. In short, described herein are systems, methods and apparatus for selective archival and backup of data.

Techniques are provided for selecting high value data on a storage medium for selective archival and backup on a second storage medium. In at least one embodiment, data may be assigned a value based on various characteristics of the data. For example, in various embodiments described herein, data may be assigned a high value for archival based on subject matter of the data, frequency of use of the data, user input and the like. Portions of data stored on a first storage medium are then selected based on the value and stored on a second storage medium. In at least one embodiment, the first storage medium may be associated with a first computing device and the second storage medium may be associated with a second computing device. The portion of data to be archived may then be transferred from the first computing device to the second computing device over an appropriate communication link, such as a communication network, USB, Firewire or the like and stored upon the second storage medium of the second computing device. If the first storage medium fails, then the data may be transferred from the second storage medium of the second computing device to the first computing device or a replacement device thereof and utilized to restore a portion of the first storage medium.

In at least one embodiment, the data stored on a storage medium comprises multimedia data, associated with a multimedia device, such as photos, video content, audio content, audio/video content or the like. Data may be selected for backup based on characteristics or attributes of the multimedia content, such as the subject matter of the multimedia content, frequency of use/viewing, metadata provided by a content provider or the like. Selected data may then be transferred from a first multimedia device to a second multimedia device and stored for backup purposes on a storage medium of the second multimedia device. In at least one embodiment, the selection and backup process may be transparent to the user. For example, backup data stored on the second multimedia device may be stored on storage locations that are not user accessible on the second multimedia device and the existence of the backup data stored thereupon may be transparent to a user of the second multimedia device. In other words, a user of the second multimedia device may not be aware that backup copies of data from the first multimedia device are stored on the second multimedia device.

Because complete duplication of data may not be appropriate in all circumstances, the techniques described herein strike a balance to provide backup of content which is most valued by the user. For example, two entertainment devices may have different capacity recording mediums and it may not be possible to backup all of the content from a larger recording medium onto a smaller capacity recording medium. Likewise, it may be inefficient to completely duplicate data stored on a storage medium, as the recording capacity for storing unique data or content on the two storage mediums is significantly diminished. This is especially true for storing data/content that is easily replaceable, such as content stored on a DVR that is frequently broadcasted. Thus, in the techniques described herein, data which is more difficult to replace and/or more valuable to a user is given a higher priority for backup, such that if a recording medium of an device fails, then the user can at least restore some of their higher valued data/content.

FIG. 1 illustrates an embodiment of a communication system 100. The communication system 100 includes a first computing device 102A, a second computing device 102B and a communication network 104. Each of the computing devices 102A and 102B includes at least one storage medium 110A and 110B, respectively. The communication system 100 may include other components, elements or devices not illustrated for the sake of brevity.

The first computing device 102A may comprise any electronic device capable of processing and storing data on the storage medium 110A. Examples of the first computing device 102A include a desktop, laptop or tablet computer, mobile telephone or other wireless communication device, personal digital assistant (PDA), television receiver (e.g., cable, satellite, over-the-air or internet protocol television (IPTV)), DVR, MP3 player or other audio playback device, video game console, portable video player and the like. The first computing device 102A processes, receives and/or generates data stored on the storage medium 110A.

The storage medium 110A may comprise any type of storage device, such as a magnetic hard drive, flash memory, optical storage, magnetic storage or the like. The data stored upon the storage medium 110A may include any type of data received, utilized and/or generated by the first computing device 102A. Examples of data stored on the storage medium 110A includes without limitation text files, databases, e-mails, software applications, photos, videos, audio files and the like.

In at least one embodiment, the second computing device 102B may be similar to the first computing device 102A and the second storage medium 110B may store similar data as the first storage medium 110A. For example, the first and second computing devices may both be computers that store various types of data, such as e-mails, word processing files, multimedia files and the like generated by one or more users. It is also to be appreciated that the first and second computing devices 102A and 102B may comprise different types of electronic devices that receive, generate and/or process disparate types of data. For example, the first computing device 102A may comprise a digital jukebox that stores audio files for playback and the second computing device 102B may comprise a DVR that receives and stores audio/video content (e.g., television programs) for playback by a user.

The first and second computing devices 102A and 102B are communicatively coupled through the communication network 104. The communication network 104 may utilize any desired combination of wired (e.g., cable and fiber) and/or wireless (e.g., cellular, wireless, satellite, microwave, and radio frequency) communication mediums and any desired network topology (or topologies when multiple mediums are utilized). Exemplary communication networks include wireless communication networks, public switched telephone networks (PSTN), and local area networks (LAN) or wide area networks (WAN) providing data communication services.

During operation, the first computing device 102A selects a portion of the data stored on the storage medium 110A for backup. In at least one embodiment, data is selected for backup based on characteristics of the data, such as the content or subject matter of the data, metadata associated with the backup or the like. The first computing device 102A then transmits the selected data to the second computing device 102B through the communication network 104. The second computing device 102B receives the data and stores the same on the second storage medium 110B.

Subsequently, the first computing device 102A or a replacement device thereof may request retrieval of the backup data from the second computing device 102B. The second computing device 102B retrieves the data from the second storage medium 110B and transmits the retrieved data to the first computing device 102A. The first computing device 102A receives the data and stores the same on the first storage medium 110A. Thus, the first computing device 102A may retrieve and restore backup copies of data stored on the second storage medium 110B and restore data lost because of data corruption, errors, a physical device failure or the like.

For example, a hard drive associated with the first computing device 102A may store various files of video content. Portions of the video files may be selected by the first computing device 102A and transmitted to the second computing device 102B for backup. Subsequently, the first storage medium 110A may fail and restoration of the files stored thereupon may be desired. The first computing device 102A (or a replacement thereof) may request retrieval of the files from the second computing device 102B via a message transmitted therebetween. The second computing device 102B retrieves the requested files from the second storage medium 110B and transmits the files to the first computing device 102A (or a replacement device thereof). The first computing device 102A then restores the received files onto the first storage medium 110A.

In at least one embodiment, a certain capacity of the second storage medium 110B may be available for storing backup copies of files from the first storage medium 110A. The allocated backup capacity of the second storage medium 110B may be significantly smaller than the total capacity of the first storage medium 110A and there may not be sufficient room to store backup copies of all of the files of the first storage medium 110A onto the second storage medium 110B. For example, 10% of the capacity of the second storage medium 110B may be dedicated to backing up content from the first computing device 102A. Thus, the first computing device 102A may prioritize the files to be backed up to efficiently utilize the backup capacity allocated on the second storage medium 110B.

Files may be selected for archival based on various attributes or characteristics of the files. For example, files that are frequently used/accessed by a user may be assigned a higher priority for backup than files which are infrequently used/accessed. In at least one embodiment, the subject matter/content of a file may be utilized to determine the priority for backup of the file. For example, files storing certain types of data or certain subjects of data may have a higher priority for backup than other files. In at least one embodiment, a user may assign a value to the priority for backing up particular files, either explicitly (e.g., providing input specifying the priority) or implicitly based on other actions taken by the user (e.g., locking the deletion of the files by others). It is to be appreciated that any combination of the aforementioned attributes or characteristics may be utilized to select files for archival depending on desired design criteria.

Figure 2:
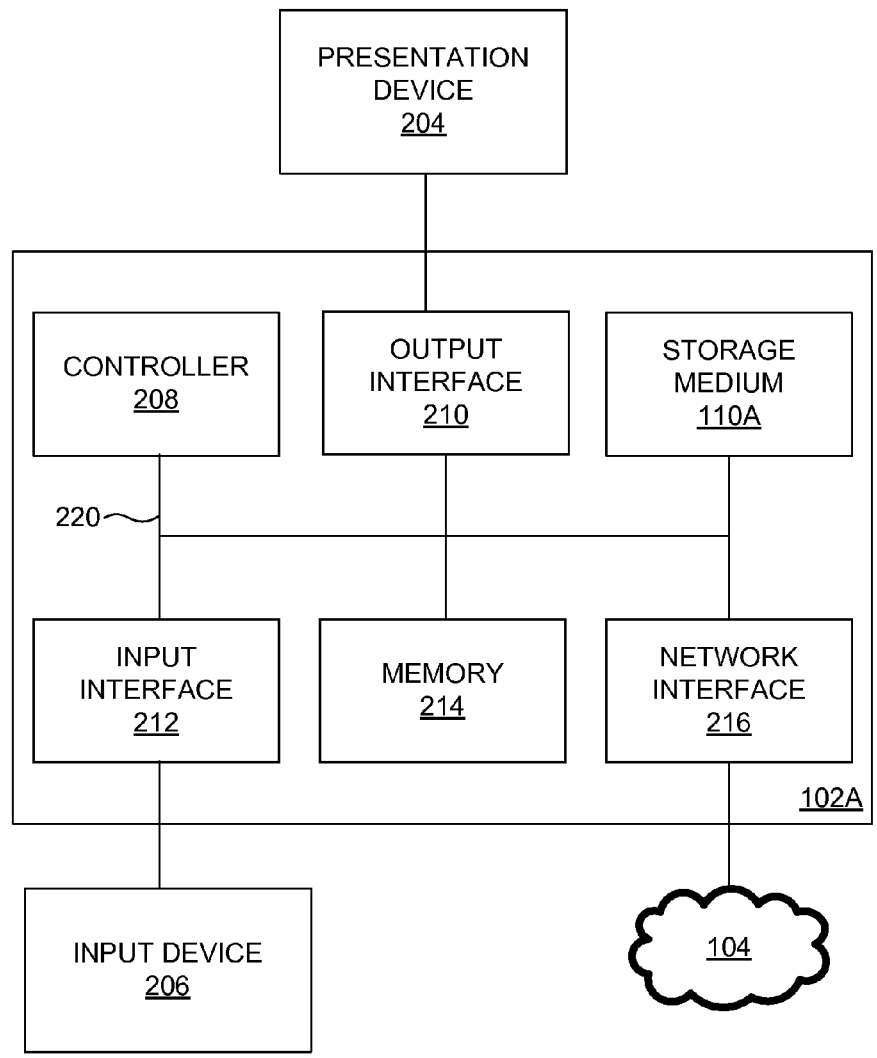
FIG. 2 illustrates an embodiment of a computing device of FIG. 1.

FIG. 2 illustrates an embodiment of a computing device 102A of FIG. 1. The computing device 102A includes a presentation device 204, an input device 206, a controller 208, an output interface 210, an input interface 212, a memory 214, a storage medium 110A and a network interface 216. The components of the computing device 102A may be communicatively coupled together by one or more data buses 220 or other type of data connection. The computing device 102A may include other elements, components or devices not illustrated for the sake of brevity.

The computing device 102A may include any type of computing device, such as a television receiver, personal computer, laptop, server, audio playback device or the like. The controller 208 is operable for controlling the operation of the computing device 102A. As used herein, controller 208 refers to a single processing device or a group of inter-operational processing devices. The operation of controller 208 may be controlled by instructions executable by controller 208. Some examples of instructions are software, program code, and firmware. Various embodiments of controller 208 include any sort of microcontroller or microprocessor executing any form of software code.

The controller 208 is communicatively coupled to the memory 214, which is operable to store data during operation of the controller 208. Such data may include software and firmware executed by the controller 208 as well as system and/or program data generated during the operation of the controller 208. Memory 214 may comprise any sort of digital memory (including any sort of read only memory (ROM), RAM, flash memory and/or the like) or any combination of the aforementioned.

The computing device 102A also includes a storage medium 110A, which is any kind of mass storage device operable to store files and other data associated with the computing device 102A. In at least one embodiment, the storage medium 110A comprises a magnetic disk drive that provides non-volatile data storage. In another embodiment, the storage medium 110A may comprise flash memory. It is to be appreciated that the storage medium 110A may be embodied as any type of magnetic, optical or other type of storage device capable of storing data, instructions and/or the like.

In the embodiment shown in FIG. 2, the computing device 102A also includes an appropriate network interface 216, which operates using any implementation of protocols or other features to support communication by the computing device 102A on communication network 104. In various embodiments, network interface 216 supports conventional LAN, WAN or other protocols (e.g., the TCP/IP or UDP/IP suite of protocols widely used on the Internet) to allow the computing device 102A to communicate on communication network 104 as desired. Network interface 216 typically interfaces with communication network 104 using any sort of LAN adapter hardware or the like provided within computing device 102A.

The computing device 102A also includes an output interface 210 operable to interface with the presentation device 204. More particularly, the output interface 210 is operable to output information for presentation by the presentation device 204. The output interface 210 may be operable to output any type of presentation data to the presentation device 204, including audio data, video data, audio/video (A/V) data, textual data, imagery or the like.

The presentation device 204 may comprise any type of device capable of presenting data received from the computing device 102A. In at least one embodiment, the presentation device 204 comprises a monitor communicatively coupled to the output interface 210 via any type of appropriate wired or wireless connection. In another embodiment, the presentation device 204 comprises a television communicatively coupled to the output interface 210 via video or A/V cabling, such as component A/V cables, composite A/V cables, High-Definition Multimedia Interface (HDMI) cables, S-video cables, coaxial cables or a wireless connection, e.g., WiFi, Bluetooth and the like. In at least one embodiment, the presentation device 204 comprises an audio receiver and/or one or more speakers for outputting audio data, such as music.

It is to be appreciated that the computing device 102A and the presentation device 204 may be separate components or may be integrated into a single device. For example, the computing device 102A may comprise a set-top box (e.g., a cable television or satellite television receiver) and the presentation device 204 may comprise a television communicatively coupled to the set-top box. In another example, the computing device 102A and the presentation device 204 may be embodied as a laptop with an integrated display screen or a television with an integrated cable receiver, satellite receiver and/or DVR.

The input interface 212 is operable to interface with one or more input devices 206. The input device 206 may comprise any type of device for inputting data to the computing device 102A. More particularly, data received from the input device 206 may be used to control the operation of the controller 208 and/or the output of data to the presentation device 204. The input interface 212 and the input device 206 may be communicatively coupled using any type of wired or wireless connection, including USB, WiFi, infrared and the like. In some embodiments, the input interface 212 may comprise a wireless receiver for receiving any type of RF or IR communication from the input device 206. Exemplary input devices 206 include keyboards, mice, buttons, joysticks, microphones, remote controls, touch pads and the like. In at least one embodiment, the computing device 102A comprises a television receiver and the input device 206 comprises a television remote control communicatively coupled to the television receiver.

The input device 206 may be further operable to control the operation of the presentation device 204. For example, the presentation device 204 may comprise a television that is remotely controlled by the input device 206 using IR or RF signals. In at least one embodiment, the input device 206 may be integrated with the presentation device 204. For example, the input device 206 and the presentation device 204 may comprise a touch screen display. The input device 206 may also be integrated with the computing device 102A. For example, the input device 206 may comprise buttons of the computing device 102A, such as an integrated keyboard of a laptop or a front panel display with buttons of a television receiver or other type of entertainment device.

The storage medium 110A may store data files having varying importance to a user. The preservation of some files in the case of storage errors or physical failure of the storage medium 110A may be very important to a user, whereas the preservation of other files on the storage medium 110A may be less critical.

In operation, the controller 208 identifies one or more files stored on the storage medium 110A for selective archival/backup on the second computing device 102B. The controller 208 initiates retrieval of the files from the storage medium 110A and transmission of the files to the second computing device 102B via the network interface 216. In at least one embodiment, the backup process may be performed transparently to a user. The backup process may be performed at any time according to any type of schedule. For example, the backup process may be performed in the middle of the night when a user is not using the first or second computing devices 102A and 102B.

In at least one embodiment, the storage medium 110A may subsequently fail or may otherwise experience data corruption affecting the storage of data thereupon. After repair of the storage medium 110A, the controller 208 may initiate transmission of a request via the network interface 216 to the second computing device 102B. The message may request retrieval of the backup files stored on the second storage medium 110B. The second computing device 102B transmits the files to the network interface 216 and the controller 208 coordinates restoration and storage of the files onto the first storage medium 110A.

The computing device 102A may also be configured to store backup data for the second computing device 102B. For example, the network interface 216 may receive files from the second computing device 102B and the controller 208 may coordinate storage of the files onto the first storage medium 110A. In at least one embodiment, the storage of backup files onto the first storage medium 110A may be performed transparently to a user of the first computing device 102A. In other words, a user of the first computing device 102A may not be aware of the storage of the files onto the storage medium 110A. For example, the output interface 210 may output menus of files stored on the storage medium 110A, and such menus may not illustrate to a user the existence of backup files stored on the storage medium 110A.

In at least one embodiment, two similar computing devices 102A and 102B may each be configured to store a portion of backup data associated with the other device. Thus, a portion of the capacity of each computing device's 102A-102B storage medium 110A-110B may be allocated to storage of backup data for the other device depending on desired design criteria. For example, 20% of the storage capacity of each storage medium 110A-110B may be allocated to storing backup data for the other computing device 102A-102B.

The techniques described herein are particularly applicable to selectively archiving multimedia content, such as photos, audio content, video content or audio/video content. For example, the techniques described herein may be utilized to selectively archive recorded television programs on a DVR. The embodiments described herein will be described in the context of a television distribution network and an associated DVR. However, it is to be appreciated that the techniques may also be applied to other types of multimedia systems, such as audio playback devices or video game consoles.

Figure 3:
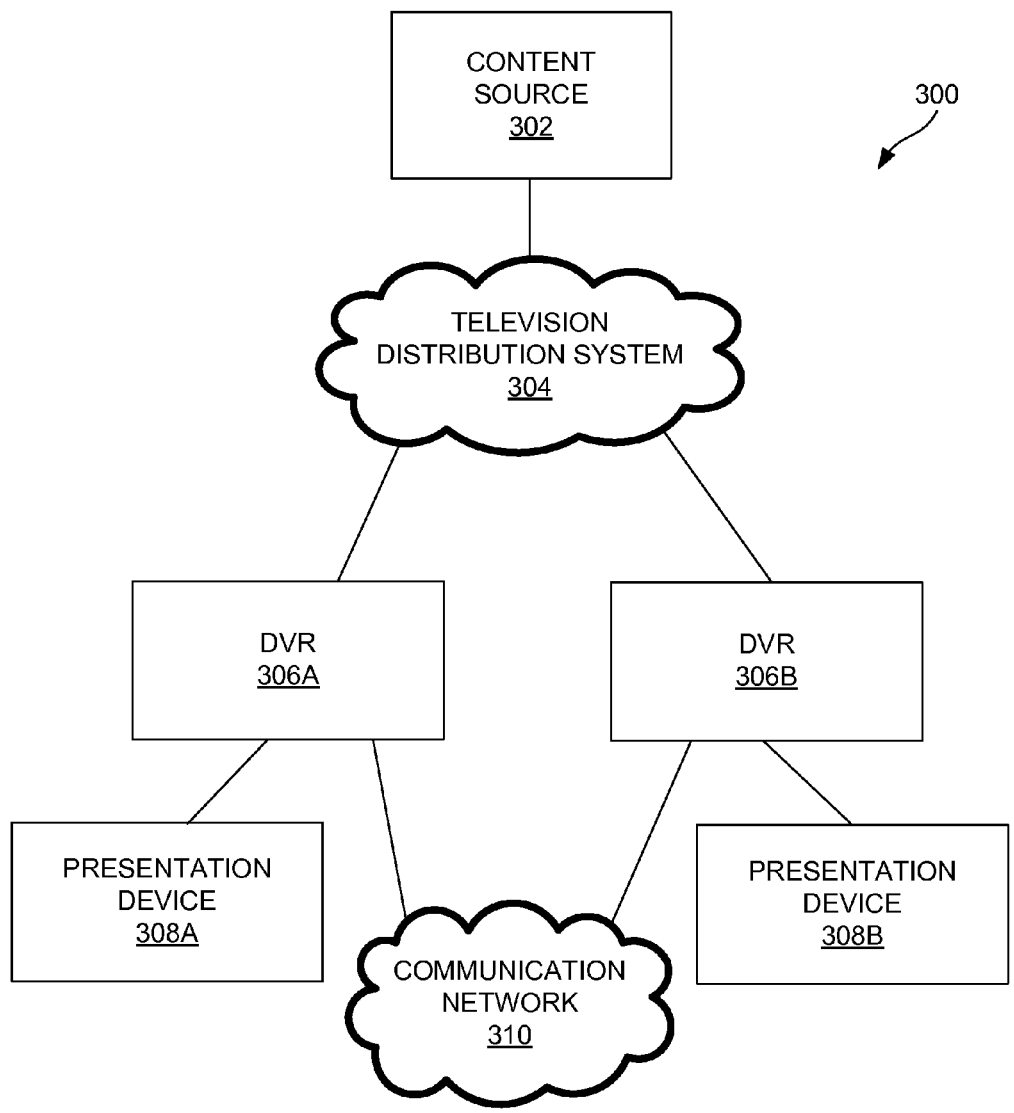
FIG. 3 illustrates another embodiment of a communication system.

FIG. 3 illustrates an embodiment of a communication system 300. The communication system 300 includes a content source 302, a television distribution system 304, DVRs 306A and 306B, presentation devices 308A and 308B and a communication network 310. Each of these components is discussed in further detail below. The communication system 300 may include other components, elements or devices not illustrated for the sake of brevity.

The content source 302 is operable for receiving, generating and communicating content to one or more DVRs 306A-306B. The content to be received, processed, outputted and/or communicated may come in any of various forms including, but not limited to, audio, video, data, information, or otherwise. In at least one embodiment, the content source 302 is operable for receiving various forms and types of content from other sources, aggregating the content and transmitting the content to the DVRs 306A-306B through the television distribution system 304. It is to be appreciated that the content source 302 may receive practically any form and/or type of information from one or more sources including streaming television programming, recorded audio or video, electronic programming guide data and the like.

The television distribution system 304 is operable to transmit content from the content source 302 to the DVRs 306A-306B. The television distribution system 304 may comprise any type of wired (e.g., cable and fiber) and/or wireless (e.g., cellular, satellite, microwave, and other types of radio frequency) communication medium and any desired network topology (or topologies when multiple mediums are utilized). Exemplary television distribution systems 304 include terrestrial, cable, satellite and internet protocol television (IPTV) distribution systems. In at least one embodiment, the television distribution system 304 broadcasts or multicasts content to a plurality of DVRs 306A-306B. The television distribution system 304 may also distribute content to a specific addressable DVR 306A-306B, such as video-on-demand content and the like. In at least one embodiment, the content source 302 may be embodied as a transmission facility of the television distribution system 304. Exemplary content sources 302 include over-the-air (OTA) terrestrial transmission facilities, cable television distribution head-ends, satellite television uplink centers, broadband or internet servers and the like. The television distribution system 304 may also distribute non-video content, such as electronic programming guide data and the like which is processed by a DVR 306A-306B.

Each DVR 306A-306B is operable to receive content from the television distribution system 304 and store the received content for subsequent presentation to a user. Each DVR 306A-306B is further operable to output the received and/or stored content for presentation by the presentation device 308A-308B. In at least one embodiment, the presentation devices 308A-308B are display devices (e.g., televisions) configured to display content to a user. The DVRs 306A-306B may receive an audio/video stream in any format (e.g., analog or digital format), and store and output the audio/video stream for presentation by the presentation device 308. In at least one embodiment, the DVRs 306A-306B may be integrated with a television receiver, such as a satellite, cable, over-the-air, broadband or other type of television receiver that receives and demodulates television signals that are outputted for display on a display device (e.g., a television). As used herein, a television receiver or DVR may also be referred to as a set-top box, which is a television receiver that is located externally with respect to a display device. The DVRs 306A-306B may be further configured to output menus and other information that allow a user to control the output of audio/video content by the DVRs 306A-306B, view electronic programming guides (EPGs), set recording timers and the like. In some embodiments, the DVRs 306A-306B and the presentation devices 308A-308B may be integrated as a device combining the functionality of a display device and television receiver/DVR or the like.

Responsive to particular recording timers or recording commands, each DVR 306A-306B coordinates the reception of video signals associated with a television program through a television receiving resource (e.g., a television tuner) and storage of the video signal onto a storage medium (e.g., a hard drive or Flash memory). In at least one embodiment, each recorded television program may be stored in a separate file on a storage medium of the DVR 306A-306B. A DVR 306A-306B may include any number of television receiving resources utilized for receiving television programs. A DVR 306A-306B minimally includes at least one television receiving resource to receive and record video signals associated with a television program. A DVR 306A-306B may include multiple television receiving resources to record multiple television programs simultaneously. For example, a DVR 306A-306B may include two or more tuners that allow recording and/or viewing of multiple programs though a DVR 306A-306B simultaneously. In at least one embodiment, a DVR 306A-306B may include multiple types of television receiving resources, such as an over-the-air (OTA) tuner and a satellite and/or cable television tuner that may be utilized to receive and/or record programs from multiple sources.

The DVRs 306A and 306B are communicatively coupled through a communication network 310 and exchange data therebetween. The communication network 310 may comprise any type of communication network and may be similar to the communication network 104 (see FIG. 1). For example, the communication network 310 may comprise a LAN within a home coupling two or more DVRs 306A-306B. In another embodiment, the communication network 310 may comprise the internet or other WAN communicatively coupling multiple DVRs 306A-306B in disparate locations.

Figure 4:
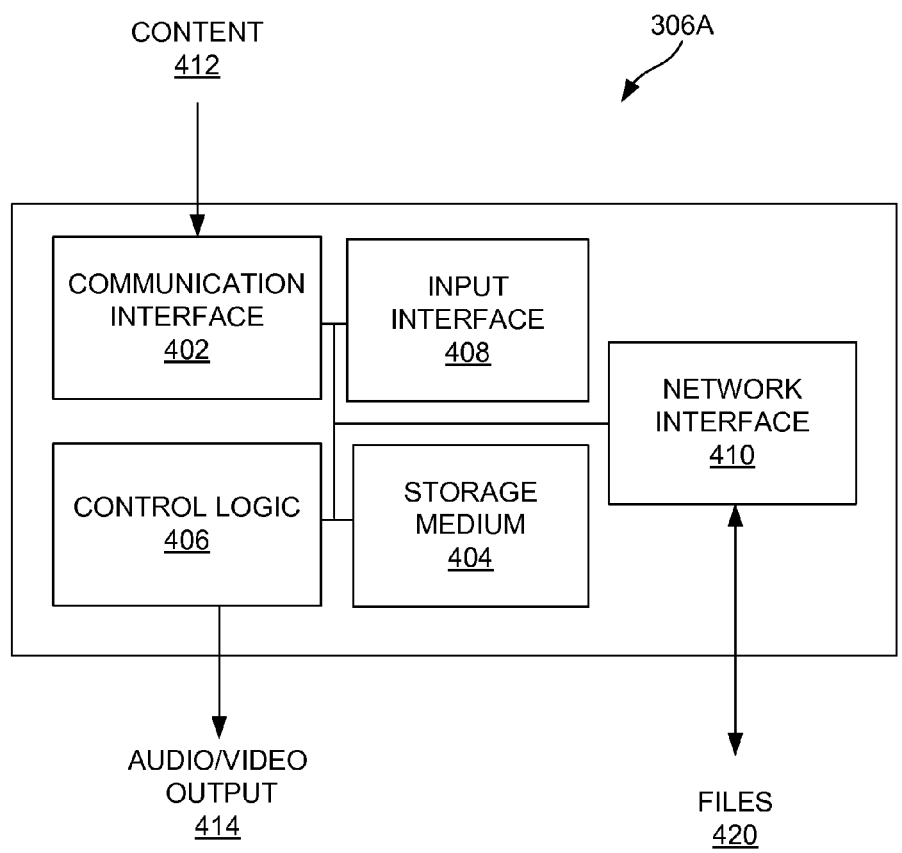
FIG. 4 illustrates an embodiment of a DVR of FIG. 3.

FIG. 4 illustrates an embodiment of a DVR 306A of FIG. 3. FIG. 4 will be discussed in reference to the communication system 300 illustrated in FIG. 3. The DVR 306A includes a communication interface 402, a storage medium 404, control logic 406, an input interface 408 and a network interface 410. Each of these components will be discussed in greater detail below. The DVR 306A may include other elements, components or devices which are not illustrated for the sake of brevity.

The communication interface 402 is operable to receive content 412 from the television distribution system 304. More particularly, in at least one embodiment, the communication interface 402 receives and tunes a television signal including television programming. The communication interface 402 may receive an over-the-air (OTA) broadcast, a direct broadcast satellite signal, a cable television signal or an IPTV signal and tune the content 412 to extract the selected television programming. In at least one embodiment, the communication interface 402 may comprise multiple tuners, utilized by the DVR 306A to output and/or record multiple television programs simultaneously.

The storage medium 404 is operable to persistently store video signals recorded by the DVR 306A. The storage medium 404 may comprise any type of non-volatile memory appropriate for storing video signals or other content recorded by the DVR 306A. Exemplary storage mediums 404 include hard drives (e.g., magnetic memory), flash memory, battery backed up memory and the like. In at least one embodiment, the storage medium 404 may be internally located within the DVR 306A. In other embodiments, the storage medium 404 may be located external with respect to the DVR 306A. The DVR 306A may also utilize a combination of internal and external storage mediums 404 for storage of video signals.

The input interface 408 is operable to wirelessly receive data from a remote control (not shown in FIG. 4). The input interface 408 may communicate with a remote control utilizing any type of IR or RF communication link. In at least one embodiment, the input interface 408 receives a key code from a remote control (not shown in the figures) and responsively provides the key code to the control logic 406 for processing. The data received from the remote control may be utilized by the control logic 406 to control the output of content by the control logic 406.

The control logic 406 is operable to control the operation of the DVR 306A. The control logic 406 may be a single processing device or a plurality of processing devices that cooperatively operate to control the operation of the DVR 306A. The control logic 406 may include various components or modules for processing and outputting audio/video content. Exemplary components or modules for processing audio/video content include a demodulator, a decoder, a decompressor, a conditional access module and a transcoder module.

The control logic 406 coordinates storage of the content 412 onto the storage medium 404. More particularly, in at least one embodiment, the control logic 406 operates responsive to recording timers configured on the DVR 306A to command the communication interface 402 to receive content from a specified channel and coordinates storage of the content onto the storage medium 404. The control logic 406 may also operate to store content received from the communication interface 402 responsive to user input requesting to record a presently viewed program (e.g., the user presses a record button).

In at least one embodiment, the control logic 406 is operable to generate an audio/video output 414 based on the content 412, e.g., pass through the signal for display by an associated presentation device 308A. The control logic 406 is also operable to retrieve stored video content from the storage medium 404 to generate an audio/video output 414 for display by the presentation device 308A. The presentation device 308A then presents the audio/video output 414 to the user. The control logic 406 may incorporate circuitry to output the audio/video streams in any format recognizable by the presentation device 308A, including composite video, component video, Digital Visual Interface (DVI), High-Definition Multimedia Interface (HDMI), 1394 and WiFi The control logic 406 may also incorporate circuitry to support multiple types of these or other audio/video formats. In at least one embodiment, as described above, the DVR 306A may be integrated with the presentation device 308A, and the control logic 406 may be operable to control the presentation of the audio/video output 414 by the presentation device 308A.

To coordinate the storage of the content 412, the control logic 406 is operable to receive user input requesting to record one or more television programs. The control logic 406 responsively sets recording timers associated with the television programs. Responsive to the recording timers, the control logic 406 coordinates the recording of the content 412 into a file of the storage medium 404.

The network interface 410 is connected to a communication network 310 (see FIG. 3) and provides bi-directional data transmission between the DVR 306A and the DVR 306B and/or other devices on the communication network 310. In at least one embodiment, the network interface 410 is an Ethernet connection communicatively coupled to the internet or other type of data communication network. It is to be appreciated that other types of wired and wireless connections may be utilized, such as WiFi, depending on desired design criteria.

In at least one embodiment, the control logic 406 identifies various files 420 for transmission to the DVR 306B and the network interface 410 initiates transmission of the files 420 to the DVR 306B through the communication network 310. The DVR 306B receives and stores the files 420 for backup purposes. The control logic 406 may then subsequently request retrieval of the files 420 from the DVR 306B and utilize the received files 420 to restore data stored on the storage medium 404.

Similarly, the network interface 410 may receive different files 420 from the DVR 306B and provide the files 420 to the control logic 406 for further processing. For example, the DVR 306B may provide files 420 to the DVR 306A for backup storage on the storage medium 404. The control logic 406 coordinates storage of the files 420 onto the storage medium 404 for backup purposes. Responsive to a subsequent request, the control logic 406 is operable to initiate retrieval of the backup copies of the files 420 on the storage medium 404 and transmission of the files 420 through the network interface 410 to the DVR 306B.

As described above, data may be selected for backup based on various characteristics or attributes of the files. In at least one embodiment, data is assigned a value based on various criteria and high valued content is prioritized for backup on another computing device. For example, various heuristic rules may be applied to identify high value content. The DVR 306A may then select portions of data stored on a storage medium based on the values and transmit the selected portions of data to another computing device for backup storage.

For example, a user may provide input specifying the importance of the file (e.g., high, medium or low importance), either when setting a recording timer or subsequent to recording of the event. In at least one embodiment, a user may lock a file from deletion. The locking of the file may be utilized by the control logic 406 to implicitly specify the importance of the file. The importance of the file may then be utilized to prioritize files for backup on another computing device. In at least one embodiment, a content provider may provide metadata, in association with video content, specifying the importance of an event. For example, a big sporting event, such as the Super Bowl, may be designated as a high importance event, whereas a particular episode of a news program, such as Sports Center may be designated as a low importance event.

In at least one embodiment, the content or subject matter of an event may be utilized to prioritize backup of particular content. For example, specific programs of content may be assigned a high value, such as top rated programs, programs frequently viewed by the user, programs which the user typically watches related programming (e.g., same series or similar genre) or the like. In at least one embodiment, programs broadcast on a specific channel may be assigned a high value based on the broadcast network.

In at least one embodiment, one-off or special edition programming may be identified as a high value event. For example, a special news program about the death of a celebrity may be identified as a high value event. A one-time purchase event may also be tagged as high value content. In at least one embodiment, programming which is recorded responsive to a single instance recording timer rather than a recurring recording timer may be identified as a high value event. For example, a user that sets a recording timer to record a single episode of Seinfeld more likely places a high value on the recording than a user that has recorded every episode of Seinfeld using a recurring timer.

A user's viewing habits may also be utilized to identify high value content. For example, content which has been viewed repeatedly may be identified as high value content based on the frequency of viewing. In at least one embodiment, if a user frequently views a particular series of programming, then programming from that series may be designated as high value content. For example, if the user views every episode of a particular program, then one or more episodes of the program may be identified as high value content. In at least one embodiment, the control logic 406 may place particular emphasis on valuing unviewed content. For example, if a user watches every episode of a particular television series, then the control logic 406 may identify unviewed episodes of the series television series as high value content until the episode is viewed. In at least one embodiment, the genre of programming may also be utilized to identify the value of content for backup. For example, if a user predominantly watches horror programming, then the control logic 406 may value horror programming higher than other genres of programming, such as romantic comedies.

In at least one embodiment, the frequency of broadcast for particular programming may also be utilized to identify the value of the content. For example, programming which is frequently broadcasted may have less value to the user because the content is more easily replaceable. Thus, if the storage medium 404 fails, then the control logic 406 may be able replace frequently broadcasted content (e.g., syndicated programming, such as Sponge Bob Square pants) quickly by recording subsequent broadcasts of the programming. In at least one embodiment, the control logic 406 searches an electronic programming guide to identify future broadcasts of programming. If future broadcasts are located, then the control logic 406 may assign a lower-value to the content, depending on desired design criteria. For example, the control logic 406 may decide to allocate limited backup space to other programming which is not broadcast as frequently. In at least one embodiment, the control logic 406 may evaluate the value of content periodically as broadcast schedules change. For example, a frequently broadcasted program which is subsequently removed from the programming schedule may be reassigned a higher value once replacement of the program becomes more difficult.

It is to be appreciated that the control logic 406 may utilize any technique for selecting high value content for backup based on desired design criteria. Described herein are various embodiments of evaluating the value of content for backup purposes. The control logic 406 may utilize any combination of the aforementioned techniques for selecting content for backup depending on desired design criteria.

In at least one embodiment, content may be transmitted from the DVR 306A to the DVR 306B for backup in real-time. In other words, content is transmitted from the DVR 306A to the DVR 306B for backup as the content is being recorded. For example, the control logic 406 may operate to provide content 412 received by the communication interface 402 to the storage medium 404 for storage, the network interface 410 for transmission to the DVR 306B and to the presentation device 308A for output of the audio/video output 414 substantially simultaneously. Thus, content is backed up at an earlier time, lessening the likelihood of loss of the content if the DVR 306A fails prior to operation of a subsequent archiving process.

While the techniques described herein are particularly applicable to backing up content on a set of paired DVRs 306A-306B, it is to be appreciated that archival of content may be performed across a number of similar devices. For example, the DVR 306A may transmit content for backup to multiple similar DVR devices communicatively coupled over a communication network. In at least one embodiment, data is duplicated across each of the other DVRs. For example, a single backup program may be stored on multiple other DVRs. In other embodiments, the DVR 306A may identify a portion of content stored thereupon for backup on other devices and may divide the selected content for backup on other devices. In other words, the DVR 306A stores a first portion of content on a first device, a second portion of content on a second device and a N-th portion of content on an N-th device.

In at least one embodiment, a communication network includes a plurality of DVR devices, each storing a distinct set of user accessible content. In the event of a storage failure, a DVR may be operable to retrieve content from various devices of the network to restore its data. Because many users record the same program, it may be possible for a DVR to restore its data in the event of a storage failure without having previously backed up content on other storage devices. Rather, the DVR may retrieve copies of the data from other storage devices of the network which are already storing the same data. This technique may be augmented with the selective archival techniques described above to backup less popular content on other devices of the network while leveraging highly available content stored on other devices to restore a storage medium in the event of a failure.

Figure 5:
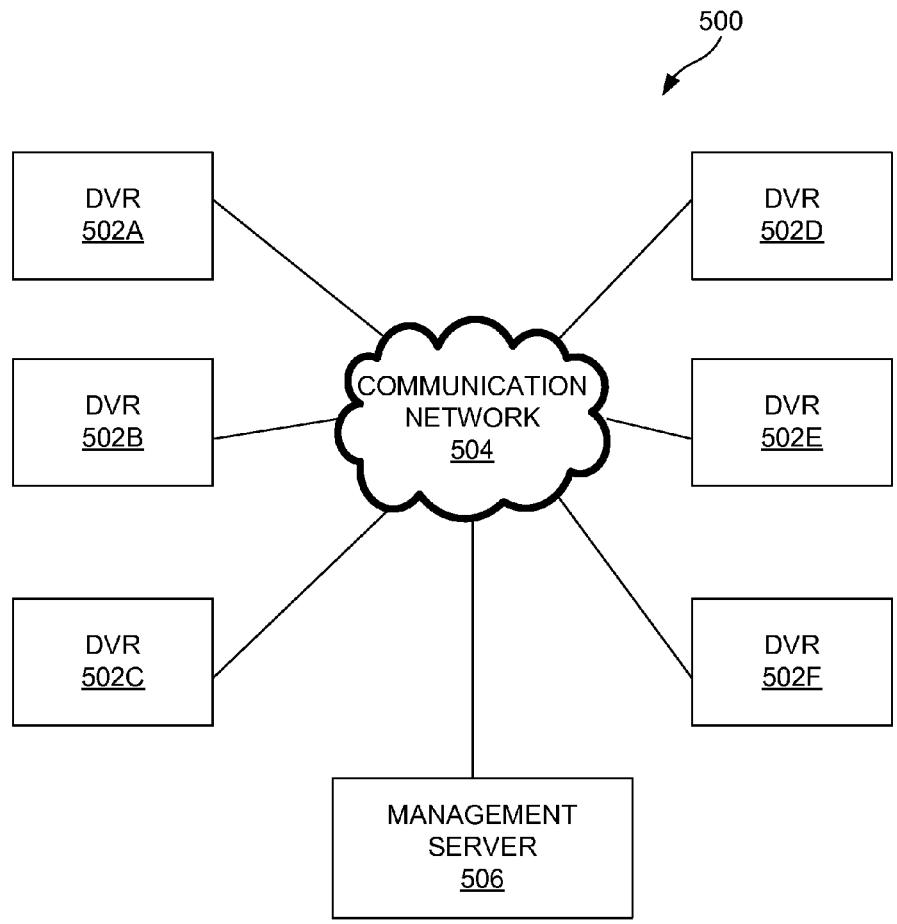
FIG. 5 illustrates another embodiment of a communication system.

FIG. 5 illustrates an embodiment of a communication system 500. The communication system 500 includes a plurality of DVRs 502A-502F, a communication network 504 and a management server 506. Each of these components is discussed in greater detail below. The communication system 500 may include other components, elements or devices not illustrated for the sake of brevity.

Each of the DVRs 502A-502F is operable to receive and store content. Each DVR 502A-502F may have the same recording capacity or a different recording capacity depending on desired design criteria. The DVRs 502A-502F may be similar to the DVRs 306A-306B (see FIGS. 3 and 4) and further discussion in omitted herein for the sake of brevity.

The communication network 504 is operable to communicatively couple the DVRs 502A-502F with each other and with other devices of the communication network 504, such as the management server 506. The communication network 504 may be similar to the communication networks 104 (see FIG. 1) and 310 (see FIG. 3) and further discussion is omitted herein for the sake of brevity.

The management server 506 is operable to manage the backup of content among the DVRs 502A-502F. In at least one embodiment, the management server 506 maintains a profile of content stored on each of the DVRs 502A-502F. The management server 506 may be further operable to request each of the DVRs 502A-502F to backup content on another DVR 502A-502F, depending on various factors. In at least one embodiment, the management server 506 may be a separate physical device distinct from the DVRS 502A-502F. In another embodiment, the functionality of the management server 506 may be performed by one or more of the DVRs 502A-502F.

Table 1 illustrates an embodiment of the content stored on each of the DVRs 502A-502F. As illustrated in Table 1, there are ten programs that are recorded on the various DVRs 502A-502F. The management server 506 receives data from each of the DVRs 502A-502F specifying the content stored thereupon, either in real-time or based upon a periodic schedule. Based upon the data in Table 1, the management server 506 determines whether a particular DVR should transfer content to another device for backup.

TABLE 1

Content stored on the DVRs

| DVR ID | \multicolumn{10}{c}{Program} |
|---|---|---|---|---|---|---|---|---|---|---|
|  | 1 | 2 | 3 | 4 | 5 | 6 | 7 | 8 | 9 | 10 |
| A | X |   | X |   | X |   | X | X |   | X |
| B | X | X |   |   |   |   | X |   |   |   |
| C |   | X |   | X |   | X | X | X | X | X |
| D | X | X | X |   | X | X | X |   | X | X |
| E | X | X |   |   | X | X |   |   |   | X |
| F | X |   |   |   |   |   | X |   |   |   |

As illustrated in Table 1, program 1 has been recorded by five of the six DVRs 502A-502F. Thus, in at least one embodiment, the management server 506 may determine that none of the DVRs 502A-502F should backup this particular program on another device due to the widespread availability of the program on the communication network 504. Similarly, programs 2, 7 and 10 have been recorded by at least four of the six DVRs 502A-502F, and programs 5, 6 and 8 have been recorded by at least three of the six DVRs 502A-502F, so it may not be desirable to backup copies of these particular programs due to the widespread availability of the recordings.

By contrast, program 4 has been recorded by just one of the six DVRs 502A-502F. Thus, it may be desirable to backup a copy of the program on at least one of the other DVRs 502A-502F. In at least one embodiment, the management server 506 instructs the DVR 502C to transfer program 4 to another DVR, such as DVR 502F, which has the most free recording capacity. Depending on the recording capacity of the various DVRs 502A-502F, it may be desirable to backup the program 4 on multiple other DVRs 502A-502F to protect against the possibility of failure of multiple DVRs 502A-502F.

Programs 3 and 9 have both been recorded by at least two of the six DVRs 502A-502F, so the availability of these programs in the event of failure of the corresponding devices is not as widespread as the other programs. Thus, it may be desirable to backup these programs on at least one other DVR 502A-502F. For example, the management server 506 may direct the DVR 502A to transmit a copy of program 3 to the DVR 502E for backup. In the event of a storage failure, either the DVR 502A or the DVR 502D may retrieve program 3 from the DVR 502E.

In the event of a failure of any particular DVR 502A-502F, the management server 506 has records of what programs were recorded thereupon. Thus, the management server 506 may control the restoration of the programs onto the storage medium by authorizing a DVR 502A-502F to retrieve and store programming from other DVRs 502A-502F. The management server 506 is operable to allow a particular DVR to restore programming previously stored thereupon while restricting the DVR from retrieving programming which was not previously stored thereupon. For example, in the event of a failure, the DVR 502F may retrieve and store programs 1 and 8 from other DVRs 502A-502F, but may not retrieve and store any of the other programs illustrated in Table 1. Thus, the backup techniques described herein allow restoration of content that a device previously stored, while restricting the device's ability to later retrieve content which was not previously present on the device prior to failure.

Figure 6:
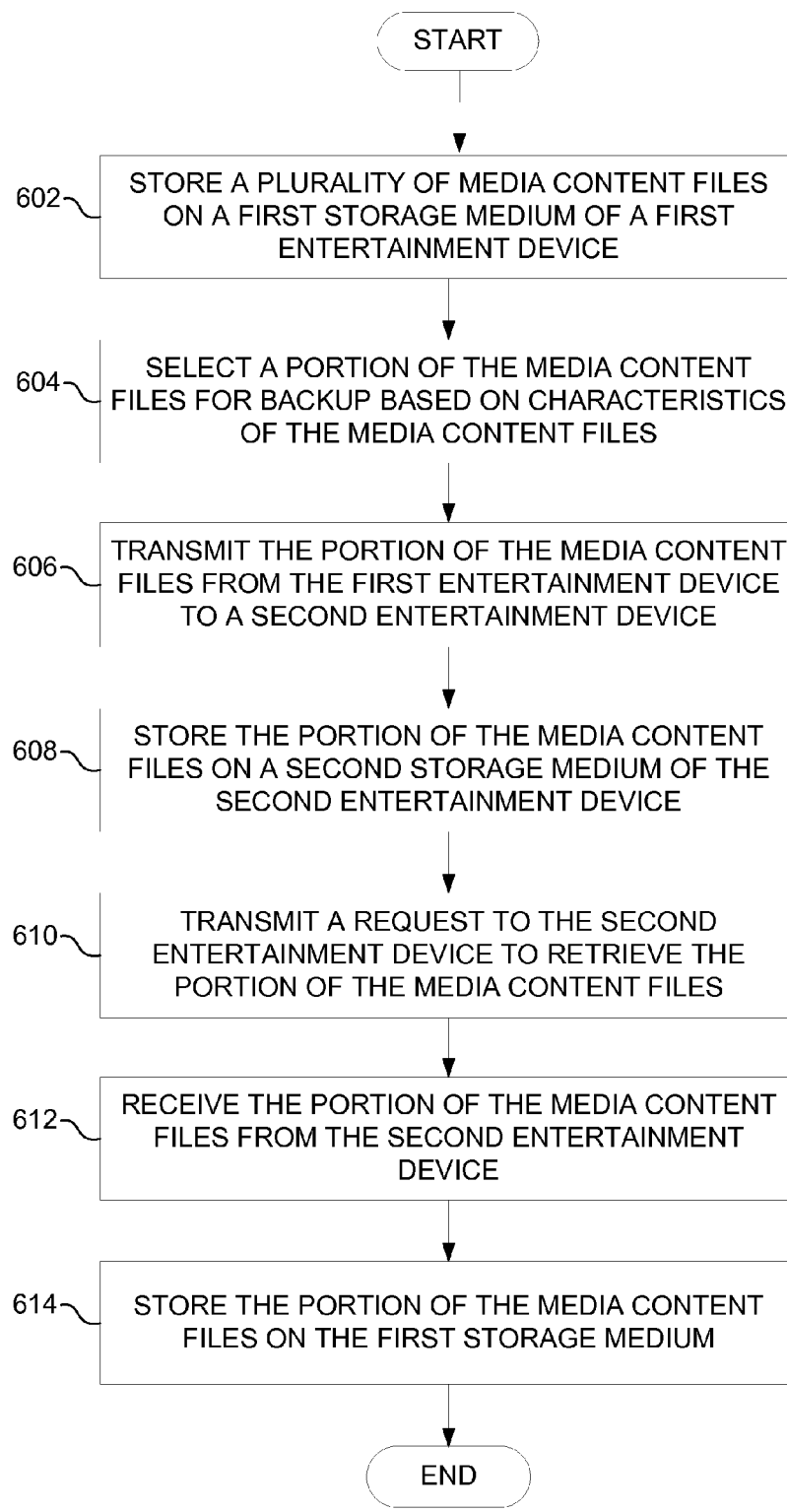
FIG. 6 illustrates a process for storing media content.

FIG. 6 illustrates a process of storing media content. The process of FIG. 6 is particularly applicable to selectively backing up stored multimedia content on other devices of a communication network. The process of FIG. 6 may include other operations not illustrated for the sake of brevity.

The process includes storing a plurality of media content files on a first storage medium of a first entertainment device (operation 602). For example, content files may be stored responsive to recording timers for various television programs.

The process further includes selecting a portion of the media content files for backup based on characteristics of the media content files (operation 604). More particularly, operation 604 may include identifying high value content for selective backup. High value content may be selected according to any of the selection techniques described above. The process further includes transmitting the portion of the media content files from the first entertainment device to a second entertainment device through a communication network (operation 606) and storing the portion of the media content files on a second storage medium of the second entertainment device (operation 608).

In the event of a storage device failure, the first entertainment device may request to retrieve content from the second entertainment device for restoration of the data. The process may further include transmitting a request to the second entertainment device to retrieve the portion of the media content files (operation 610) and receiving the portion of the media content files from the second entertainment device (operation 612). Responsive to receiving the content from the second entertainment device, the first entertainment device stores the portion of the media content files on the first storage medium (operation 614).

Although specific embodiments were described herein, the scope of the invention is not limited to those specific embodiments. The scope of the invention is defined by the following claims and any equivalents therein.

We claim:

1. A method of archiving television programs recorded by a digital video recorder, the method comprising:

storing a plurality of media content files on a first storage medium of the digital video recorder, wherein each of the media content files is associated with one of the television programs recorded by the digital video recorder;

selecting a portion of the media content files associated with the television programs for backup based on characteristics of the media content files stored on the digital video recorder; and transmitting the portion of the media content files selected for backup based upon the characteristics of media content files from the digital video recorder to a second device separate from the digital video recorder through a communication link for storage of the selected portion of the media content files on a second storage medium of the second device.

2. The method of claim 1, further comprising:
  transmitting a request to the second device to retrieve the selected portion of the media content files;
  receiving the selected portion of the media content files from the second device; and
  restoring the selected portion of the media content files on the first storage medium.

3. The method of claim 1, wherein selecting a portion of the media content files further comprises:
  identifying a value of at least one of the media content files based on characteristics of the media content files; and
  selecting the selected portion of the media content files based on the value.

4. The method of claim 3, wherein identifying the value further comprises:
  receiving user input specifying the value for the at least one of the media content files.

5. The method of claim 3, wherein identifying the value further comprises:
  receiving metadata, from a content provider, the metadata specifying the value of the at least one of the media content files.

6. The method of claim 1, wherein selecting the portion of the media content files further comprises:
  selecting the selected portion of the media content files based on a frequency of viewing of the plurality of media content files.

7. The method of claim 1, wherein selecting the portion of the media content files further comprises:
  selecting at least one unviewed media content file for backup.

8. The method of claim 1, wherein selecting the portion of the media content files further comprises:
  searching an electronic programming guide to locate other occurrences of a television program associated with the at least one of the media content files; and
  selecting the at least one of the media content files for backup responsive to locating no other occurrences of the television program in the electronic programming guide.

9. The method of claim 1, wherein selecting the portion of the media content files further comprises:
  selecting at least one media content file that has been protected by a user of the digital video recorder.

10. A digital video recorder comprising:
  a communication interface operable to receive television programming from a television distribution network;
  a network interface configured to communicate with a second digital video recorder through a communication network;
  a storage medium operable to store a plurality of media content files that are each associated with one of a plurality of television programs; and
  a controller operable to:
    select a portion of the media content files associated with the television programs for backup on the other digital video recorder based on characteristics of the media content files stored on the digital video recorder; and
    initiate transmission of the portion of the media content files selected for backup based upon the characteristics of the media content files from the digital video recorder to the second digital video recorder through the network interface.

11. The digital video recorder of claim 10, wherein:
  the processor is further operable to initiate transmission of a message to the second digital video recorder through the network interface, the message requesting to retrieve at least some of the selected portion of the media content files from the second digital video recorder;
  the network interface is operable to receive the at least some of the selected portion of the media content files from the second digital video recorder; and
  the processor is operable to coordinate storage of the at least some of the selected portion of the media content files on the storage medium.

12. The digital video recorder of claim 10, wherein the network interface is operable to receive a second portion of media content files from the second digital video recorder and the processor is operable to coordinate storage of the second portion of the media content files onto the storage medium.

13. The digital video recorder of claim 10, wherein the processor is operable to identify a value for at least one of the media content files based on characteristics of the media content files and select the selected portion of the media content files for backup based on the value.

14. The digital video recorder of claim 13, wherein the processor is operable to receive user input specifying the value for the at least one of the media content files.

15. The digital video recorder of claim 13, wherein the processor receives metadata, from a content provider, the metadata specifying the value of the at least one of the media content files.

16. The digital video recorder of claim 10, wherein the processor selects the selected portion of the media content files based on a frequency of viewing of the plurality of media content files.

17. The digital video recorder of claim 10, wherein the processor selects at least one of the media content files for backup that is unviewed by a user.

18. The digital video recorder of claim 10, wherein the processor is operable to search an electronic programming guide to locate other occurrences of a television program associated with the at least one of the media content files and select the at least one of the media content files for backup responsive to locating no other occurrences of the television program in the electronic programming guide.

19. A method executable by a management server, the method comprising:
  receiving data from first and second digital video recorders specifying first and second pluralities of media programs recorded by the first and second digital video recorders that are stored on the first and second digital video recorders, respectively;
  determining, based upon the received data, whether one of the first and the second digital video recorders should transfer content to the other for backup and, if so:
    selecting a portion of the media content files associated with the television programs for backup based on characteristics of the media content files stored on the first and second digital video recorders; and
    directing at least one of the first and second digital video recorders to transmit the portion of the media content files selected for backup based upon the characteristics of media content files to the other digital video recorder through a communication link for storage of the selected portion of the media content files on a second storage medium of the other digital video recorder.

20. The system of claim 19 wherein the determining comprises:
  monitoring lists of programs recorded by each of the digital video recorders;
  identifying redundancies between the programs recorded by each of the digital video recorders; and wherein the directing comprises directing at least one of the digital video recorders to transfer a copy of a program to the other digital video recorder for backup if insufficient redundancies are identified.

21. The system of claim 20 wherein the determining comprises identifying one of the digital video recorders having excess storage capacity, and directing copying of the program to the identified digital video recorder having excess storage capacity.

\* \* \* \* \*